No. 710,524. Patented Oct. 7, 1902.
G. J. SCOTT.
COUPLING DEVICE.
(Application filed Jan. 22, 1900.)
(No Model.)
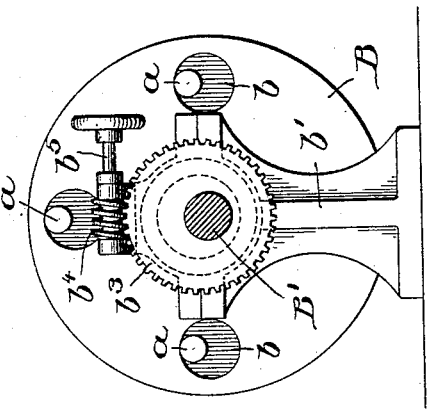
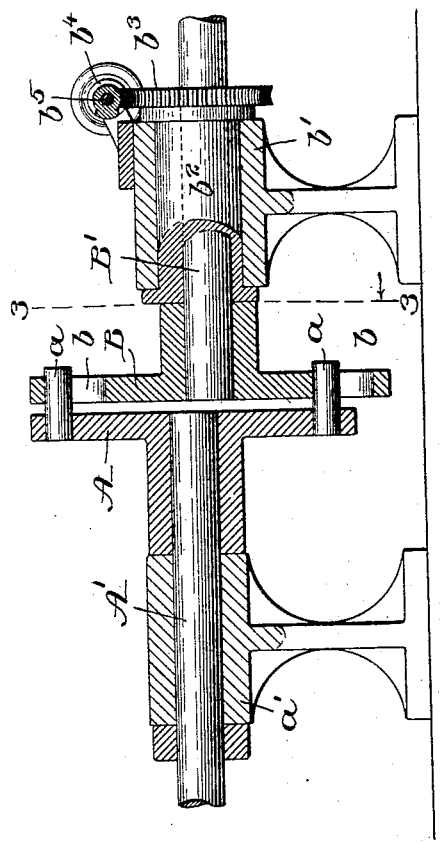
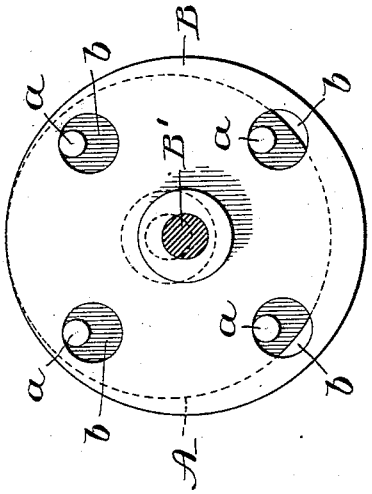
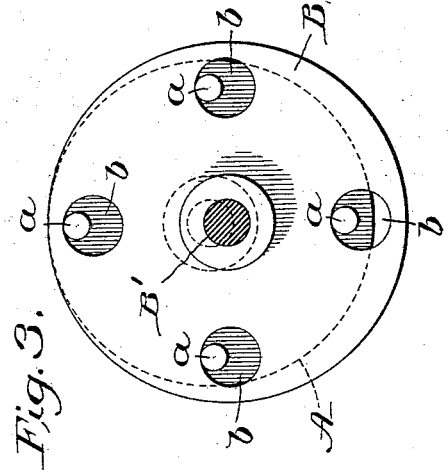
WITNESSES:
A. V. Groups
H. D. Blackwood.
INVENTOR
Gordon John Scott,
BY John K. Nolan
ATTORNEY.

UNITED STATES PATENT OFFICE.

GORDON JOHN SCOTT, OF PHILADELPHIA, PENNSYLVANIA, ASSIGNOR OF ONE-HALF TO WILLIAM S. JANNEY, OF PHILADELPHIA, PENNSYLVANIA.

COUPLING DEVICE.

SPECIFICATION forming part of Letters Patent No. 710,524, dated October 7, 1902.

Application filed January 22, 1900. Serial No. 2,405. (No model.)

*To all whom it may concern:*

Be it known that I, GORDON JOHN SCOTT, a citizen of the United States, residing in the city and county of Philadelphia and State of Pennsylvania, have invented certain new and useful Improvements in Coupling Devices, of which the following is a full, clear, and exact description, reference being had to the accompanying drawings, forming a part of this specification.

The object of this invention is to provide a simple and efficient coupling device whereby two rotatable members may be operatively connected in a manner to permit and insure their positive and concerted rotation at a uniform rate of speed irrespective of the angles or planes within limits that they may occupy or be caused to assume in respect to each other. The said members may be formed on or secured to independent shafts to afford a union therefor, one of which shafts may be a driving factor and the other be driven thereby, the interposed coupling permitting either or both shafts to be simultaneously or independently adjusted to different planes or angles without interrupting or affecting the coöperation of the shafts. The invention is therefore especially, though not exclusively, useful in connection with mechanism wherein the driving-shaft is rigidly supported and the driven shaft is mounted upon an oscillating frame or support or with constructions wherein prescribed adjustments of the driven shaft are required during its positive rotation.

Accordingly the invention, as generally stated, comprises two members having a positive yet yielding interlocking connection.

It also comprises novel features of construction, which will be hereinafter particularly described and claimed.

In the annexed drawings, which illustrate one form of my invention, Figure 1 is a sectional elevation of the device as applied to two shafts. Fig. 2 is an end view thereof. Fig. 3 is a transverse vertical section on the line 3 3 of Fig. 1. Fig. 4 is a similar section showing the two members as moved one-eighth of a revolution.

A B represent two rotatable members, the former of which is adapted to be rotated from a suitable source of power and the other to be rotated by the first or driving member, or the converse. In the present instance these members comprise heads or disks, one, A, of which is provided near its periphery with a series of lateral projections $a$ and the other with a corresponding series of spaces or orifices $b$, preferably circular in form, into which said projections extend. These spaces or orifices are larger in diameter than the projections and are so disposed relatively thereto that the projections simultaneously and continuously bear against the opposing parts of the member B irrespective of its position of adjustment within defined limits. Hence if the member A be rotated the projections thereon bearing against the member B will positively and uniformly revolve the latter, and this whether the member B be parallel with or inclined relatively to the member A.

It will be understood, of course, that the relative diameters of the projections and the spaces or orifices determine the extent of possible relative adjustment of the two members.

In the present instance the members A and B are represented as mounted upon the adjacent ends of two shafts A' B', respectively, which are coupled thereby. These shafts have their bearings in suitably-supported boxes $a'$ $b'$, respectively. The bearing for shaft B' comprises an eccentric bushing $b^2$, by the adjustment of which said shaft may be set in different horizontal planes. The bushing is provided with a worm-wheel $b^3$, with which gears a worm $b^4$ on a spindle $b^5$, by the rotation of which minute adjustment of the eccentric bearing may be effected.

The means just described for supporting and adjusting the shaft B' is used for illustration only.

From the foregoing it will be seen that if the plane or angle of the shaft B' be changed or adjusted while the other or driving shaft A' is in operation an unremitting circular motion will be imparted to the former shaft, owing to the uninterrupted action of the projections $a$ within the spaces or orifices of the member B. It will also be seen that if the eccentric bearing for shaft B be continuously rotated or reciprocated said shaft will be caused to rise and fall without impairing or disconcerting its speed of rotation derived from the shaft A.

I claim as my invention—

1. In a coupling device for relatively movable or adjustable parts, two rotatable members one of which is provided with a lateral projection and the other with a circular space into which said projection extends, said space being of greater width or diameter than the projection, whereby said members may be relatively adjusted in parallelism with each other and the projection will at all times coact with the wall of said space, substantially as described.

2. In a coupling device for relatively movable or adjustable parts, two rotatable members with their opposing faces out of contact with each other, one of which is provided with a series of lateral projections and the other with a corresponding series of circular spaces into which said projections extend, said spaces being of greater width or diameter than the projections, whereby said members may be relatively adjusted in parallelism with each other and the projections will at all times coact with the walls of said space, substantially as described.

3. In a coupling device for relatively movable or adjustable parts, two rotatable members, one of which is provided with a series of lateral projections and the other with a corresponding series of circular spaces or orifices into which said projections extend, said spaces or orifices being of greater diameter than the projections, whereby said members may be relatively adjusted in parallelism with each other and the projections will at all times coact with the walls of said space, substantially as described.

4. In a coupling device, the combination with two shafts, and means for changing their relative positions, of rotatable members on the adjacent ends of said shafts, one of which members is provided with a lateral projection, and the other with a space into which said projection extends, said space being of greater width or diameter than the projection, substantially as described.

5. In a coupling device, the combination with two shafts, and means for changing their relative positions, of rotatable members on the adjacent ends of said shafts, one of which members is provided with a series of lateral projections and the other with a corresponding series of spaces into which said projections extend, said spaces being of greater width or diameter than the projections, substantially as described.

In testimony whereof I have hereunto affixed my signature in the presence of two subscribing witnesses.

GORDON JOHN SCOTT.

Witnesses:
ANDREW V. GROUPE,
JOHN R. NOLAN.